(12) United States Patent
Matichuk et al.

(10) Patent No.: US 10,853,570 B2
(45) Date of Patent: Dec. 1, 2020

(54) REDACTION ENGINE FOR ELECTRONIC DOCUMENTS WITH MULTIPLE TYPES, FORMATS AND/OR CATEGORIES

(75) Inventors: Bruce Matichuk, Sherwood Park (CA); John Rebstock, Edmonton (CA); Michael Kraft, Edmonton (CA)

(73) Assignee: Teradact Solutions, Inc., Missoula, MT (US)

(*) Notice: Subject to any disclaimer, the term of this patent is extended or adjusted under 35 U.S.C. 154(b) by 1882 days.

(21) Appl. No.: 11/544,685

(22) Filed: Oct. 6, 2006

(65) Prior Publication Data
US 2007/0094594 A1  Apr. 26, 2007

Related U.S. Application Data

(60) Provisional application No. 60/724,986, filed on Oct. 6, 2005.

(51) Int. Cl.
*G06F 3/00* (2006.01)
*G06F 40/253* (2020.01)

(52) U.S. Cl.
CPC ................. *G06F 40/253* (2020.01)

(58) Field of Classification Search
CPC .... G06F 21/6245; G06F 17/211; G06F 21/10; G06F 17/24; G06F 17/30371; G06F 17/274; H04N 1/4446
USPC .......... 726/26; 358/448, 452, 453, 537, 538; 715/212, 216, 220, 230, 231, 233, 243, 715/246, 247, 271, 788
See application file for complete search history.

(56) References Cited

U.S. PATENT DOCUMENTS

| | | | |
|---|---|---|---|
| 5,235,681 A | 8/1993 | Masuzaki | 345/556 |
| 5,581,682 A | 12/1996 | Anderson | 715/236 |
| 5,903,646 A | 5/1999 | Rackman | 380/4 |
| 5,982,956 A | 11/1999 | Lahmi | |
| 6,279,013 B1 | 8/2001 | LaMarca | |
| 6,477,550 B1 | 11/2002 | Balasubramaniam | |

(Continued)

FOREIGN PATENT DOCUMENTS

NZ          535943      *  6/2007

OTHER PUBLICATIONS

Xerox, "FlowPort, Installation and Setup Guide, Version 2.1" © Nov. 2000, Xerox, 56 pages.

(Continued)

*Primary Examiner* — Kyler R Stork
(74) *Attorney, Agent, or Firm* — Harrington & Smith

(57) ABSTRACT

Disclosed herein is a redaction system, method and computer program product. Embodiments of the invention implement an automated redaction system for redacting electronic documents. A redaction system of the invention has a source of electronic documents to be redacted; a source of redaction rules; and a redaction engine coupled to the source of electronic documents and the source of redaction rules. The redaction system is configured to perform operations of the method of the invention by accessing electronic documents to be redacted; accessing redaction rules to be applied when redacting the electronic documents; and redacting the electronic documents in accordance with the redaction rules. In other embodiments of the invention, the electronic documents to be redacted are converted to a common electronic format prior to redaction, and redacted when in the common electronic format.

36 Claims, 17 Drawing Sheets

(56) References Cited

U.S. PATENT DOCUMENTS

| | | | |
|---|---|---|---|
| 6,889,205 B1 | 5/2005 | Lamm | 705/40 |
| 7,216,125 B2* | 5/2007 | Goodwin | |
| 7,272,610 B2 | 9/2007 | Torres | 707/101 |
| 7,292,723 B2 | 11/2007 | Tedesco et al. | 382/159 |
| 7,295,988 B1 | 11/2007 | Reeves | |
| 7,428,701 B1* | 9/2008 | Gavin et al. | 715/243 |
| 7,590,693 B1 | 9/2009 | Chan et al. | 709/206 |
| 7,624,027 B1 | 11/2009 | Stern | 705/2 |
| 7,627,152 B2 | 12/2009 | Mathew | |
| 7,653,876 B2 | 1/2010 | Ethier et al. | 715/249 |
| 8,078,512 B1 | 12/2011 | Haberaecker | |
| 8,181,261 B2 | 5/2012 | Sperry | |
| 8,521,632 B2 | 8/2013 | Planitzer | |
| 2001/0018739 A1 | 8/2001 | Anderson et al. | 713/176 |
| 2002/0062342 A1 | 5/2002 | Sidles | 709/203 |
| 2002/0065901 A1 | 5/2002 | Goodwin, III | 709/218 |
| 2002/0075505 A1 | 6/2002 | Murray | 358/1.15 |
| 2002/0083079 A1* | 6/2002 | Meier et al. | 707/104.1 |
| 2002/0091734 A1 | 7/2002 | Redlich et al. | |
| 2002/0158864 A1 | 10/2002 | Matichuk | 345/418 |
| 2002/0188187 A1 | 12/2002 | Jordan | |
| 2003/0014394 A1* | 1/2003 | Fujiwara et al. | 707/3 |
| 2003/0051054 A1* | 3/2003 | Redlich et al. | 709/246 |
| 2003/0084339 A1 | 5/2003 | Roginsky et al. | |
| 2003/0115481 A1* | 6/2003 | Baird et al. | 713/201 |
| 2003/0145017 A1* | 7/2003 | Patton et al. | 707/104.1 |
| 2003/0160095 A1* | 8/2003 | Segal | G06F 17/30011 235/375 |
| 2003/0172034 A1* | 9/2003 | Schneck et al. | 705/54 |
| 2003/0217034 A1* | 11/2003 | Shutt | G06F 17/30011 |
| 2004/0075692 A1 | 4/2004 | Matichuk | 345/806 |
| 2004/0088313 A1* | 5/2004 | Torres | 707/101 |
| 2004/0139043 A1* | 7/2004 | Lei et al. | 707/1 |
| 2004/0162831 A1* | 8/2004 | Patterson | G06F 17/30613 |
| 2004/0202386 A1* | 10/2004 | Quine | G06F 17/30011 382/305 |
| 2004/0210834 A1* | 10/2004 | Duncan | G06F 17/30011 715/255 |
| 2004/0220919 A1* | 11/2004 | Kobayashi | 707/3 |
| 2004/0236651 A1 | 11/2004 | Emde et al. | 705/34 |
| 2004/0243925 A1* | 12/2004 | Yates | G06Q 10/10 715/230 |
| 2005/0002053 A1 | 1/2005 | Meador | |
| 2005/0015723 A1 | 1/2005 | Light et al. | |
| 2005/0027495 A1 | 2/2005 | Matichuk | 703/2 |
| 2005/0063615 A1 | 3/2005 | Siegel | |
| 2005/0108351 A1* | 5/2005 | Naick et al. | 709/207 |
| 2005/0111762 A1 | 5/2005 | Mathew | |
| 2005/0246338 A1* | 11/2005 | Bird | 707/9 |
| 2005/0251865 A1 | 11/2005 | Mont | 726/26 |
| 2006/0005017 A1 | 1/2006 | Black | 713/165 |
| 2006/0075228 A1* | 4/2006 | Black et al. | 713/167 |
| 2006/0126101 A1* | 6/2006 | Shutt | H04N 1/32614 358/1.15 |
| 2006/0143459 A1* | 6/2006 | Villaron et al. | 713/176 |
| 2006/0155863 A1* | 7/2006 | Schmidt | 709/229 |
| 2006/0184522 A1* | 8/2006 | McFarland et al. | 707/5 |
| 2006/0218149 A1* | 9/2006 | Patrick | 707/9 |
| 2006/0242558 A1* | 10/2006 | Racovolis et al. | 715/511 |
| 2006/0259983 A1* | 11/2006 | Sperry | 726/28 |
| 2007/0027749 A1 | 2/2007 | Peiro | |
| 2007/0030528 A1* | 2/2007 | Quaeler et al. | 358/453 |
| 2007/0174766 A1 | 7/2007 | Rubin et al. | 715/530 |
| 2008/0204788 A1* | 8/2008 | Kelly et al. | 358/1.15 |
| 2009/0089192 A1 | 4/2009 | Ferlitsch | 705/33 |
| 2014/0019318 A1 | 1/2014 | Haberaecker | |

OTHER PUBLICATIONS

Xerox, "FlowPort, Administrator Guide," © Apr. 2003, Xerox, 76 pages.

Xerox, "FlowPort, Installation and Setup Guide," © Apr. 2003, Xerox, 62 pages.

Xerox, "FlowPort User Guide, 2.1.1 SP3 Update," © Apr. 2003, Xerox, 159 pages.

* cited by examiner

FIG. 2

| ARREST REPORT | | | |
|---|---|---|---|
| Name of Suspect | Address | Occupation | |
| John Doe | 1278 Elm Street Springfield, VA | Courier | |
| Age of Suspect | Monitoring | | |
| 32 | | | |
| Name of Officer | Badge | Home Office of Arresting Officer | |
| Henry Thompson | 1234 | Springfield, VA | |
| Type of Arrest | Felony (X) Misdemeanor ( ) | Contraband Substances | |
| Drug Trafficking | | Cocaine | |
| Narrative of Arrest | | | |

FIG. 3

| ARREST REPORT | | | | | |
|---|---|---|---|---|---|
| Name of Suspect | Address | Occupation | *SECTION REDACTED* | | |
| John Doe | 1278 Elm Street Springfield, VA | Courier | | | |
| Age of Suspect | *SECTION REDACTED* | | | | |
| 32 | | | | | |
| *SECTION REDACTED* | | | | | |
| Type of Arrest | Felony (X) Misdemeanor ( ) | Contraband Substances | | | |
| Drug Trafficking | | Cocaine | | | |
| Narrative of Arrest | | | | | |

FIG. 8

Narrative of Arrest:

On June 20, 2005 John Doe was observed by SA Henry Thompson and SA Gary Williams purchasing a ticket at the Delta Airlines ticket counter. John Doe then proceeded to the American Cafe at 123 Elm Street to meet with FPD informant "Bert". A white letter sized envelope was given to John Doe by "Bert". John Doe then gave "Bert" a small package wrapped in brown paper. SA Thompson and SA Williams followed John Doe for approximately one block before apprehending him. John Doe was placed under arrest and the small package examined and found to be cocaine.

FIG. 9

Narrative of Arrest:

On June 20, ~~2005~~ ~~John~~ Doe was observed by SA (REDACTED) and SA (REDACTED) purchasing a ticket at the (REDACTED) Airlines ticket counter. ~~John Doe~~ then proceeded to ~~the~~ American Cafe at 123 Elm Street ~~to meet~~ with FPD informant (REDACTED). A white letter sized envelope was given to John Doe by (REDACTED). ~~John Doe then gave~~ (REDACTED) a small package wrapped in brown paper. SA (REDACTED) and SA (REDACTED) followed John Doe for approximately one block before apprehending him. John Doe was ~~placed under~~ arrest and the small package examined and found to be cocaine.

REDACTION ENGINE FOR ELECTRONIC DOCUMENTS WITH MULTIPLE TYPES, FORMATS AND/OR CATEGORIES

CROSS REFERENCE TO RELATED APPLICATION

This application claims priority under 35 U.S.C. § 119(e) from U.S. Provisional Patent Application No. 60/724,986 filed on Oct. 6, 2005, which is hereby incorporated by reference in its entirety.

BACKGROUND OF THE INVENTION

Field of the Invention

The invention relates to a system, method and computer program product for creating redacted documents and, more particularly, to an automated redaction system, method and computer program product.

Brief Description of Prior Developments

U.S. Pat. No. 6,889,205, which is hereby incorporated by reference in its entirety, discloses a system and method for preparing a redacted statement, message or file from an electronic statement, message or file and sending it to a party. U.S. Patent Publication Nos. 2002/0158864, 2004/0075692, and 2005/0027495, which are hereby incorporated by reference in their entireties, describe automatic creation of graphical representations, and intelligent agents for integrating information access over extended networks.

Businesses as well as Federal, State and Local government agencies must share information. Examples include case files, arrest reports, subpoenaed documents (e.g., Freedom of Information Act—FOIA, Law Enforcement Information Sharing Program—LEISP, etc.) Redacting classified, confidential or secret information from documents can be labor intensive. No effective means of automating the process of removing sensitive information from documents exists. There is a need for a system and method for automatically removing sensitive information from documents; especially a system which can work with different document types.

SUMMARY OF THE INVENTION

A first embodiment of the invention is a system comprising a source of electronic documents to be redacted; a source of redaction rules; and a redaction engine. The redaction engine is coupled to the source of electronic documents and the source of redaction rules, and is configured to redact the electronic documents in accordance with the redaction rules. When performing redaction operations, the redaction engine accesses electronic documents to be redacted. The redaction engine also accesses redaction rules from the source of redaction rules. Then the redaction engine redacts the electronic documents in accordance with the redaction rules. After redacting the electronic documents, the redaction engine generates a tangible version of the redacted electronic documents.

A second embodiment of the invention is a computer program product comprising a computer readable storage medium. The computer readable storage medium stores a computer program configured to perform redaction operations when executed by digital processing apparatus. The operations comprise: accessing an electronic document to be redacted; accessing at least one redaction rule to be applied to the electronic document; redacting the electronic document in accordance with the redaction rule; and storing the redacted electronic document in computer memory.

A third embodiment of the invention is a method comprising: receiving redaction rules to be used in redacting electronic documents, where the redaction rules are specified in dependence on document type; storing the redaction rules to a computer memory, the computer memory comprising a source of redaction rules; accessing an electronic document to be redacted from a source of electronic documents; identifying the electronic document to be redacted by document type; accessing redaction rules from the source of redaction rules appropriate for use in redacting the type of document to which the electronic document corresponds; redacting the electronic document in accordance with the redaction rules specified for the document type to which the electronic document corresponds, creating redactions in the electronic document; and generating a tangible version of the electronic document containing the redactions.

In conclusion, the foregoing summary of the embodiments of the invention is illustrative and non-limiting. For example, one skilled in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 2 depicts a document to be redacted by a system operating in accordance with the invention;

FIG. 3 depicts the document of FIG. 2 in a redacted form generated by a system operating in accordance with the invention;

FIG. 8 depicts a field in the document shown in FIG. 1 that is to be redacted by a system operating in accordance with the invention;

FIG. 9 depicts the document field of FIG. 8 in a redacted form generated by a system operating in accordance with the invention;

DETAILED DESCRIPTION OF THE PREFERRED EMBODIMENTS

Figure 1:
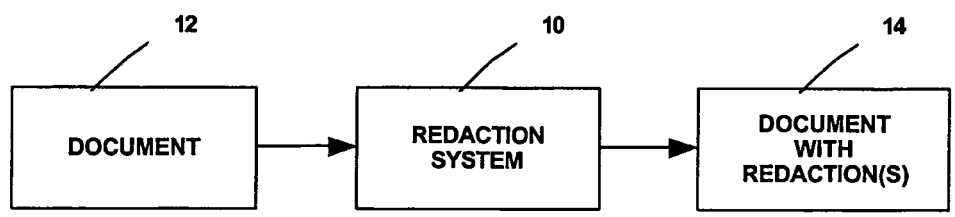
FIG. 1 is a block diagram depicting a redaction system configured to operate in accordance with the invention.

Referring to FIG. 1, there is shown a block diagram of a redaction system 10 incorporating features of the invention. Although the invention will be described with reference to the exemplary embodiments shown in the drawings, it should be understood that the invention can be embodied in many alternate embodiments.

The redaction system 10 is adapted to process a document 12 or electronic version of the document or information in the document to create a modified document 14 or electronic version of the modified document with one or more redactions. An example is shown with reference to FIGS. 2 and 3. FIG. 2 shows a portion of an arrest report 16. The arrest report 16 comprises cells 18-29. The cells of a document could be pre-established with borders such as is shown in FIG. 2, or could be established with the software of the invention. As seen with reference to FIG. 3, one or more of the cells or information in the cells can be redacted in a computer generated modified document 14 of the arrest report 16.

Figure 4:
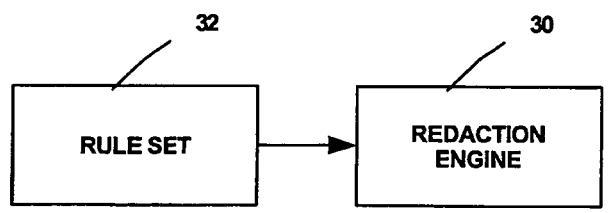
FIG. 4 is a block diagram depicting components of the redaction system comprising an embodiment of the invention depicted in FIG. 1.

Referring also to FIG. 4, the redaction system 10 generally comprises a redaction engine 30 and a rule set 32. The redaction engine 30 generally comprises a computer system. A computer system operating in accordance with the invention can take many forms such as a desktop computer; a notebook computer; or a computing system distributed across a network. In each instance, the computing system comprises a source of documents to be redacted; a memory for storing a program configured to perform operations in accordance with the methods of the invention when executed; and digital processing apparatus coupled to the source of electronic documents to be redacted and the memory. The redaction engine 30 is adapted to take an electronic version of the document 12, and remove or redact information in the document using rules accessed from the rule set 32 to produce the modified document 14. The rule set 32 comprises a set of rules and/or process models to be applied by the redaction engine 30.

Figure 5:
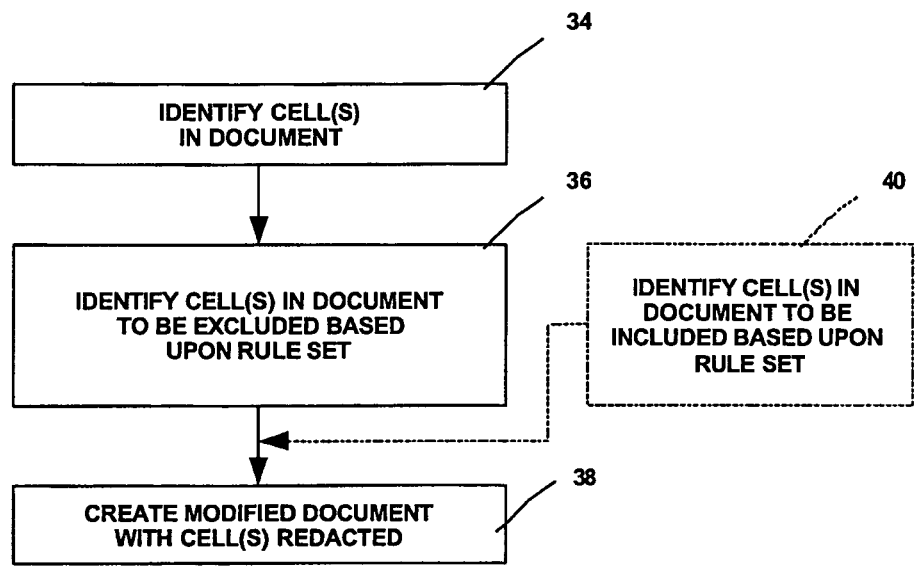
FIG. 5 is a flowchart depicting a method in accordance with the invention.

Referring also to FIG. 5, the redaction engine 30 comprises software which is adapted to identify cell(s) in a document as indicated by block 34. The redaction engine 30 is then able to identify cell(s) in the document to be excluded based upon the rule set 32 as indicated by block 36. As indicated by block 38, the redaction engine can create a modified document with one or more cells redacted. For the example shown in FIGS. 2 and 3, the redaction engine can identify the cells 18-29 in the original document 12, identify the cells 22, 23, 24 and 25 to be excluded based upon the rule set 32, and create the modified document 14 with the information in the cells 22-25 redacted. In this embodiment the redacted information is replaced by the phrase "SECTION REDACTED". However, any suitable type of redaction indicia, such as marking could be provided. In other embodiments, no redaction indicia are provided in the redacted versions of the documents. This masks from users what categories of information have been redacted.

In addition to identifying cell(s) to be excluded, or as an alternative to identifying cell(s) to be excluded when all are to be excluded unless indicated to be included, as indicated by block 40 the redaction engine 30 could be adapted to identify cell(s) in the document to be included based upon the rule set 32. If both 36 and 40 are performed and there is a conflict, preferably block 36 will prevail. However, any suitable conflict resolution configuration or solution could be provided.

Figure 6:
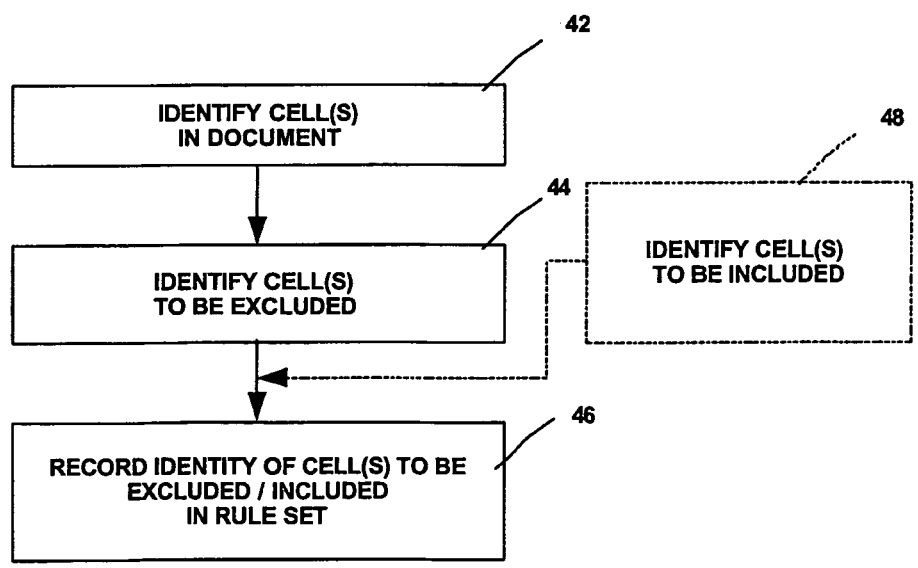
FIG. 6 is a flowchart depicting a method in accordance with the invention.

The rule set 32 is setup or established before the redaction engine 30 can run automatically. Referring also to FIG. 6, establishment of the rule set 32, or at least a portion of the rule set, can comprise identifying cell(s) to be excluded as indicated by block 44, such as the monitoring cell 22, the Name of Officer cell 23, the Badge number cell 24 and the Home Office of Arresting Officer cell 25 shown in FIGS. 2 and 3. The cell(s) in a sample document could be used to identifying cell(s) as indicated by block 42, such as the cells 18-29 shown in FIGS. 2 and 3. For example, use of software such as described in U.S. Patent Publication Nos. 2002/0158864, 2004/0075692, and 2005/0027495 could be used. The identity of the cell(s) to be excluded/included in the rule set is then recorded for that type of document as indicated by block 46 for use in the future on similar types of documents (e.g., other arrest reports). As indicated by block 48, cell(s) could also be identified to be included for use with block 40 shown in FIG. 5.

Figure 7:
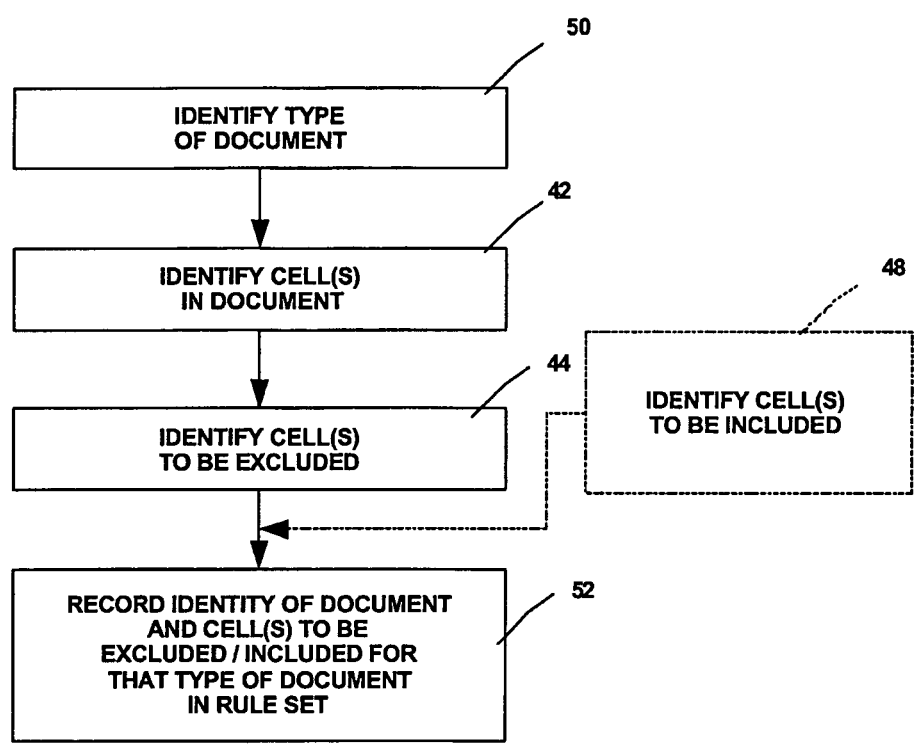
FIG. 7 is a flowchart depicting a method in accordance with the invention.

Referring also to FIG. 7, the invention can be used with different types of documents. For example, a police drug seizure report could be different than an arrest report. When the invention is used with different type documents, the redaction system is adapted to identify a type of document as indicated by block 50. This could be a manual indication of the type of document by a person inputting the document into a database, a code on the document, or automatic recognition of the document type by the redaction system for example.

After the type of document is identified, or perhaps during identification, the rule set set-up process can comprise identifying cell(s) to be excluded as indicated by block 44. The identity of the cell(s) to be excluded/included in the rule set is then recorded for that type of document as indicated by block 52 for use in the future on similar types of documents (e.g., other arrest reports). Cell(s) could also be identified to be included for use with block 40 shown in FIG. 5.

Referring also to FIG. 8, another portion of the arrest report document 12 is shown, specifically the Narrative of Arrest cell 29. Referring also to FIG. 9, which shows the cell 29 after automatic redaction by the redaction system 10, the invention can be used to redact sub-cells or text in a cell. The text could comprise words, phrases or characters or specific combinations for example. In the example shown, the names of the special agents, witness location, and name of confidential informant are automatically redacted. Other forms of information could also be redacted, such as, for example, graphical information (organization logos), visual information, photographic images, etc. These are merely examples.

Figure 10:
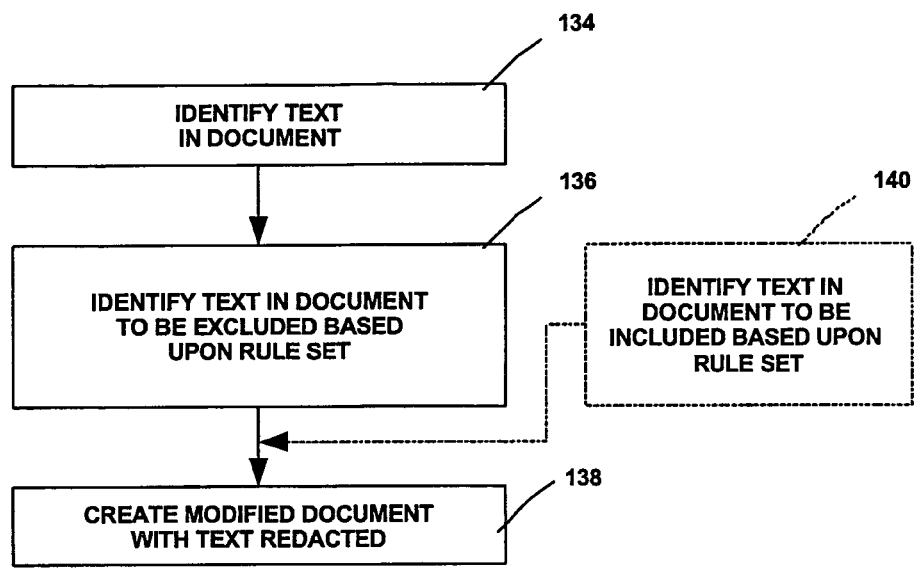
FIG. 10 is a flowchart depicting a method in accordance with the invention.

Referring also to FIG. 10, the redaction engine 30 comprises software which is adapted to identify text or words or phrases or characters in a document as indicated by block 134. The redaction engine 30 is then able to identify text or words or phrases or characters or areas in the document to be excluded based upon the rule set 32 as indicated by block 136. As indicated by block 138, the redaction engine can create a modified document with one or more of the identified areas redacted. For the example shown in FIGS. 8 and 9, the redaction engine can identify the names of the special agents, witness location, and name of confidential informant in cell 29 of the original document 12, identify the names Henry Thompson, Gary Williams, Delta Airlines, and informant Bert to be excluded based upon the rule set 32, and create the modified document 14 with the information in the automatically identified text redacted. In this embodiment the redacted information is replaced by the phrase "REDACTED". However, any suitable type of redaction marking or deletion could be provided. In addition to identifying cell(s) to be excluded, or as an alternative to identifying cell(s) to be excluded when all are to be excluded unless indicated to be included, as indicated by block 140 the redaction engine 30 could be adapted to identify cell(s) in the document to be included based upon the rule set 32. If both 136 and 140 are performed and there is a conflict, preferably block 136 will prevail. However, any suitable conflict resolution configuration or solution could be provided. In this example, the text to be redacted in cell 29 could be imported into the rule set from a database(s) containing names of police officers, confidential informants and witnesses for example.

Figure 11:
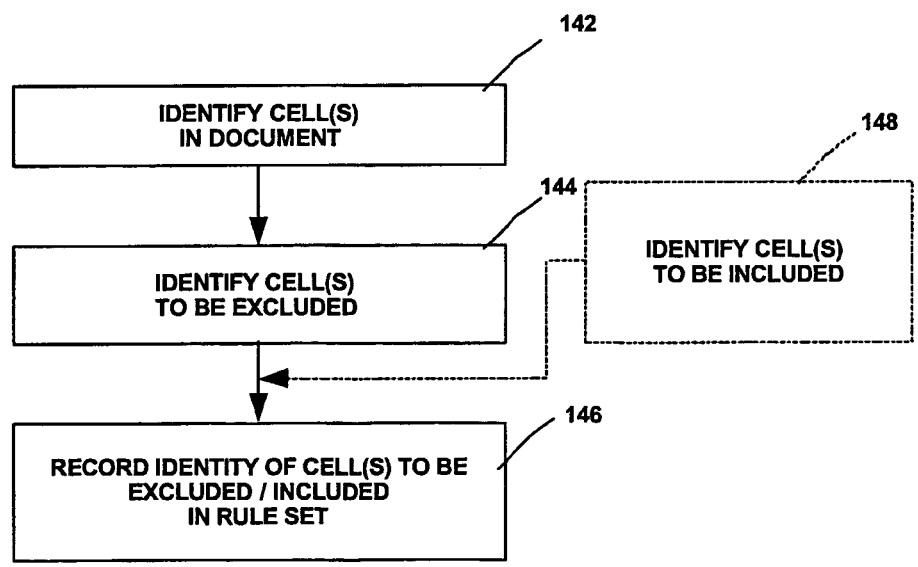
FIG. 11 is a flowchart depicting a method in accordance with the invention.

Referring also to FIG. 11, establishment of the rule set 32, or at least a portion of the rule set, can comprise identifying text to be excluded as indicated by block 144, such as the names of officers as shown in FIGS. 8 and 9. Text recognition software or an optical recognition software could be used. The text in previous redacted documents could be used to identify text to be excluded. For example, use of software such as described in U.S. Patent Publication Nos. 2002/0158864, 2004/0075692, and 2005/0027495 could be used. The identity of the cell(s) to be excluded/included in the rule set is then recorded for that type of document as indicated by block 146 for use in the future on similar types of documents (e.g., other arrest reports). As indicated by block 148, cell(s) could also be identified to be included for use with block 140 shown in FIG. 10.

Figure 12:
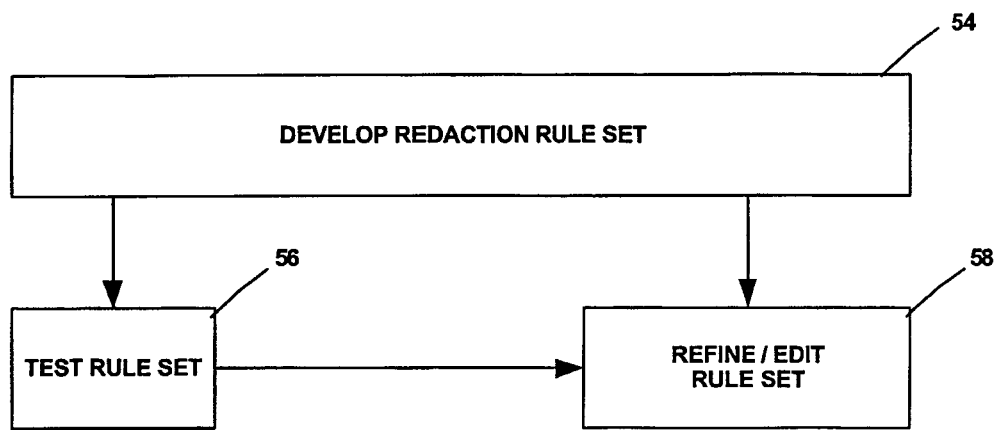
FIG. 12 is a flowchart depicting a method in accordance with the invention.

Referring also to FIG. 12, once a rule set is developed as indicated by block 54, the rule set is preferably tested as indicated by block 56. Testing can also be conducted periodically after the rule set is in place. As indicated by block 58, the rule set can preferably be refined and edited. For example, names of police officers can change because of the addition of new police officers. The rule set could be edited to include the names of new police officers. In addition, if testing finds an error or conflict causing an error, the rule set can preferably be refined. Rules could also be auto-generated based upon subsequent manual redactions by users. The rules set could be accumulating for redaction maintenance. There could be automatic use of common rules for multiple users or documents or other specifics.

Figure 13:
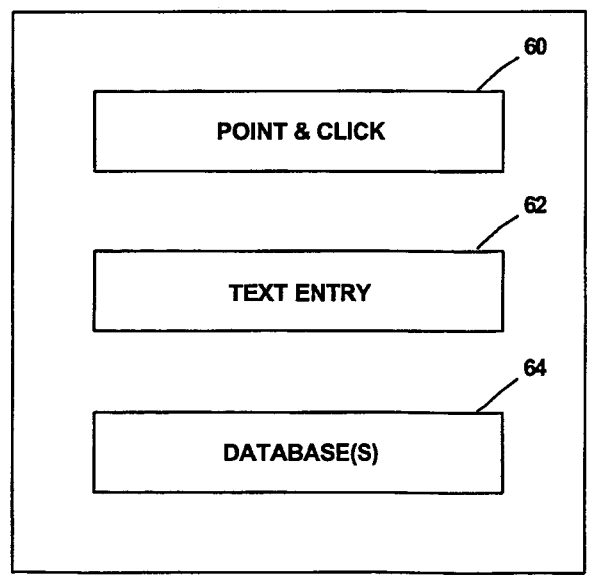
FIG. 13 depicts tools for use in entering rules into the rule set of the invention.

Referring now also to FIG. 13, identification of cells and text in a document for a rule set can comprise, for example, a point and click procedure with a mouse as indicated by block 60, a text or data entry by a keyboard as indicated by block 62, or import from another database as indicated by block 64. These are only some examples of how information can be input into a rule set. Any suitable alternative for data entry could be used including relationship correlation in text. For example:

If "X" before "Y", then redact "X" and "Y".

Figure 14:
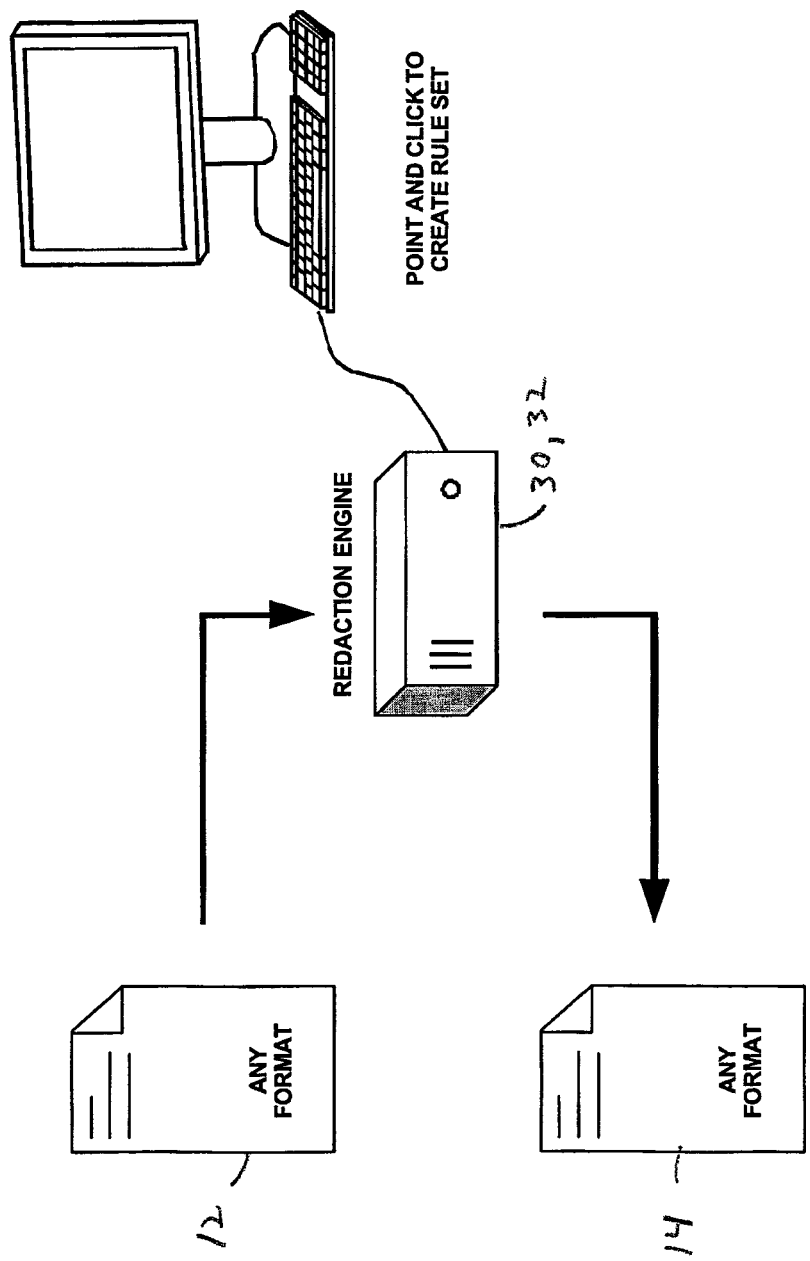
FIG. 14 depicts an aspect of the invention wherein the invention can operate on documents in any format.
Figure 15:
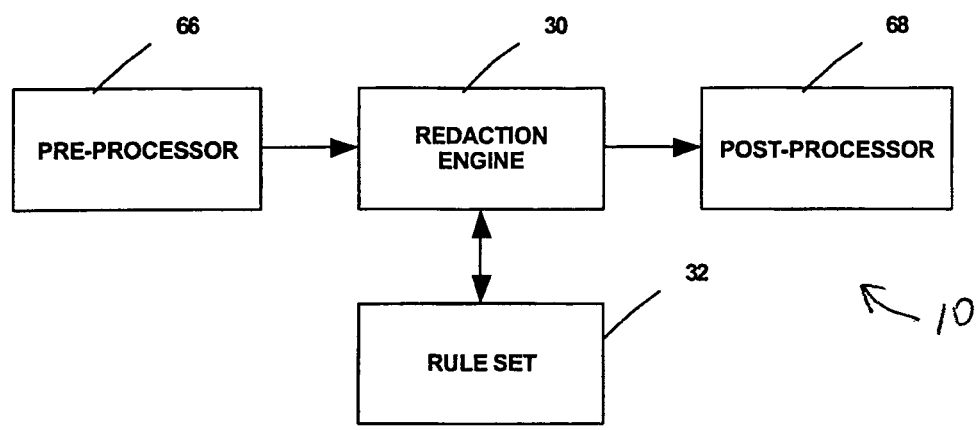
FIG. 15 is a block diagram of a system in accordance with the invention.
Figure 16:
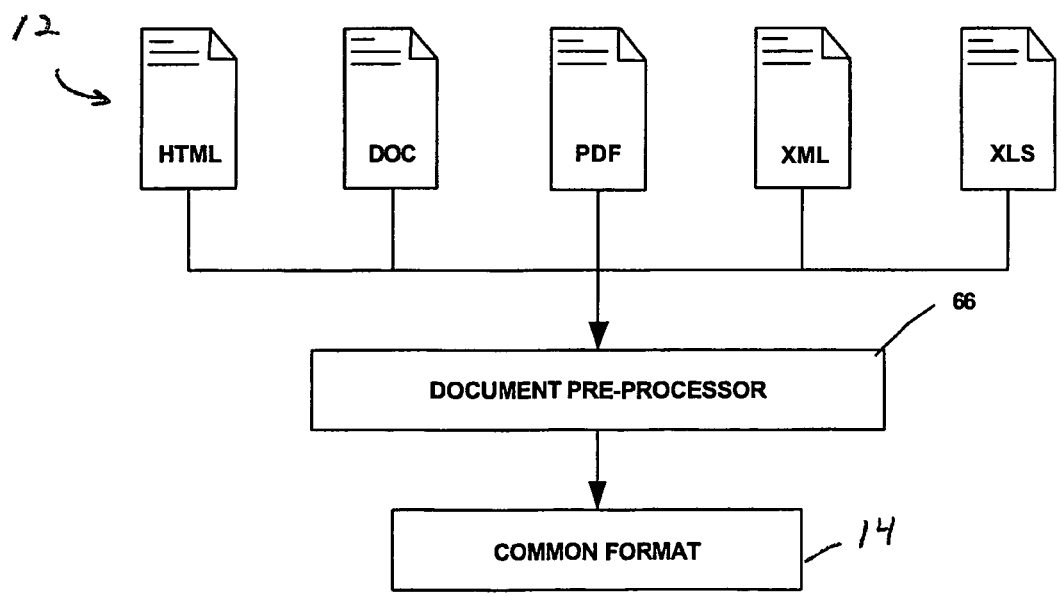
FIG. 16 is a block diagram depicting documents in several formats being input into a system operating in accordance with the invention for redaction purposes and being output in a common format.
Figure 17:
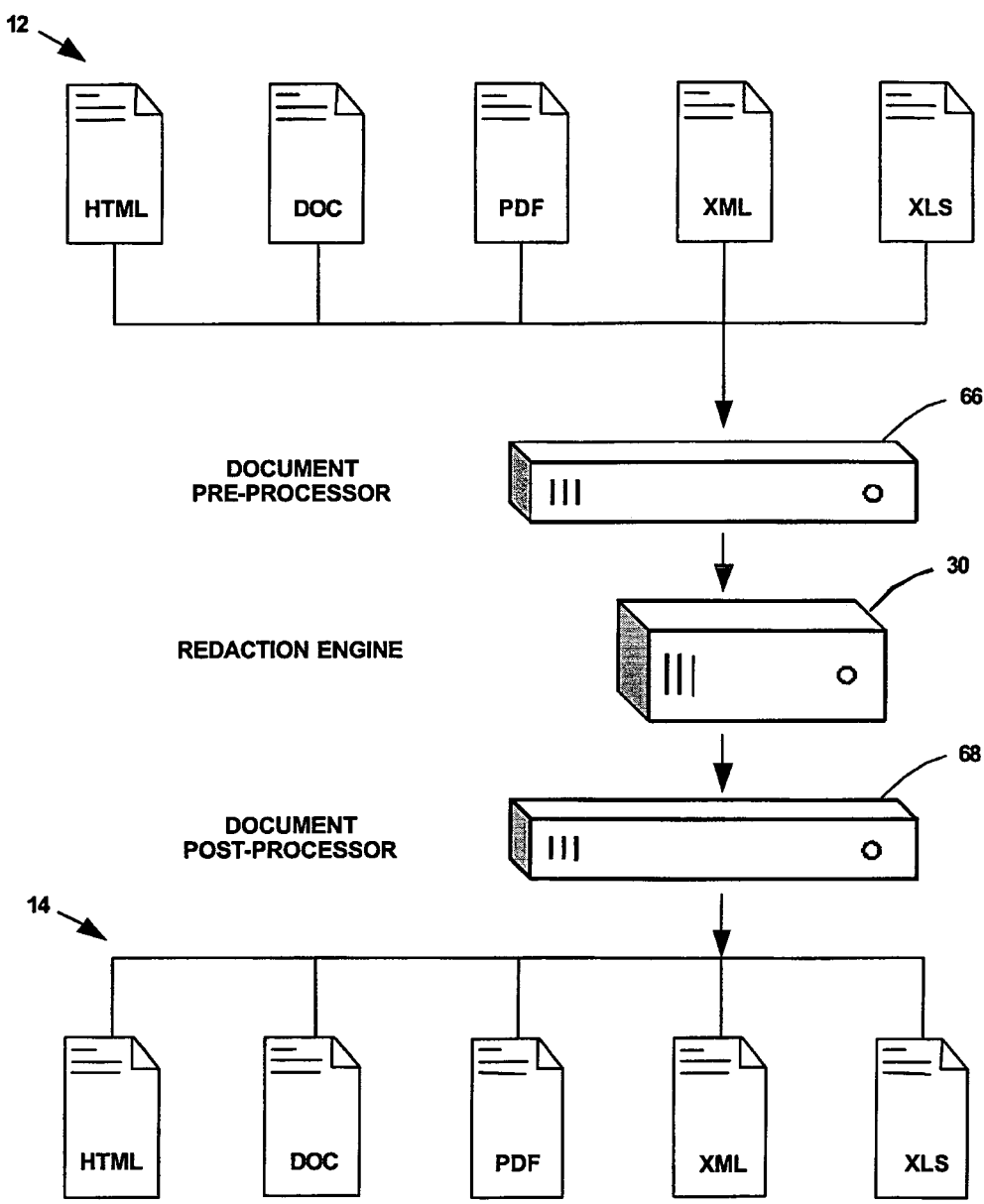
FIG. 17 is a block diagram depicting documents in several formats being input into a system operating in accordance with the invention for redaction purposes and being output in several formats.

Referring also to FIG. 14, in a preferred method the system is adapted to work with any suitable type of original document format and output any suitable type of modified document format. Referring also to FIGS. 15-17, the original document 12 could comprise any one of a plurality of different document formats. For example, the original document could comprise HTML, DOC, PDF, XML, or XLS format. The system could be adapted to work with any suitable format. Those formats mentioned above are merely examples. As illustrated in FIG. 15, the redaction system 10 can comprise a document pre-processor 66 and a document post-processor 68. As seen with reference to FIG. 16, the document pre-processor 66 is adapted to convert the format of the original document 12 to a common format 14' such as WEBRECORDER™ XML format or CELWARE XML format by CelCorp Inc. for example. This allows a document to be broken into regions to be identified with the redaction rule set. After the redaction engine, the document post-processor 68 can convert the modified document from its common format 14' to a target format 14, such as a HTML, DOC, PDF, XML, or XLS format for example.

Figure 18:
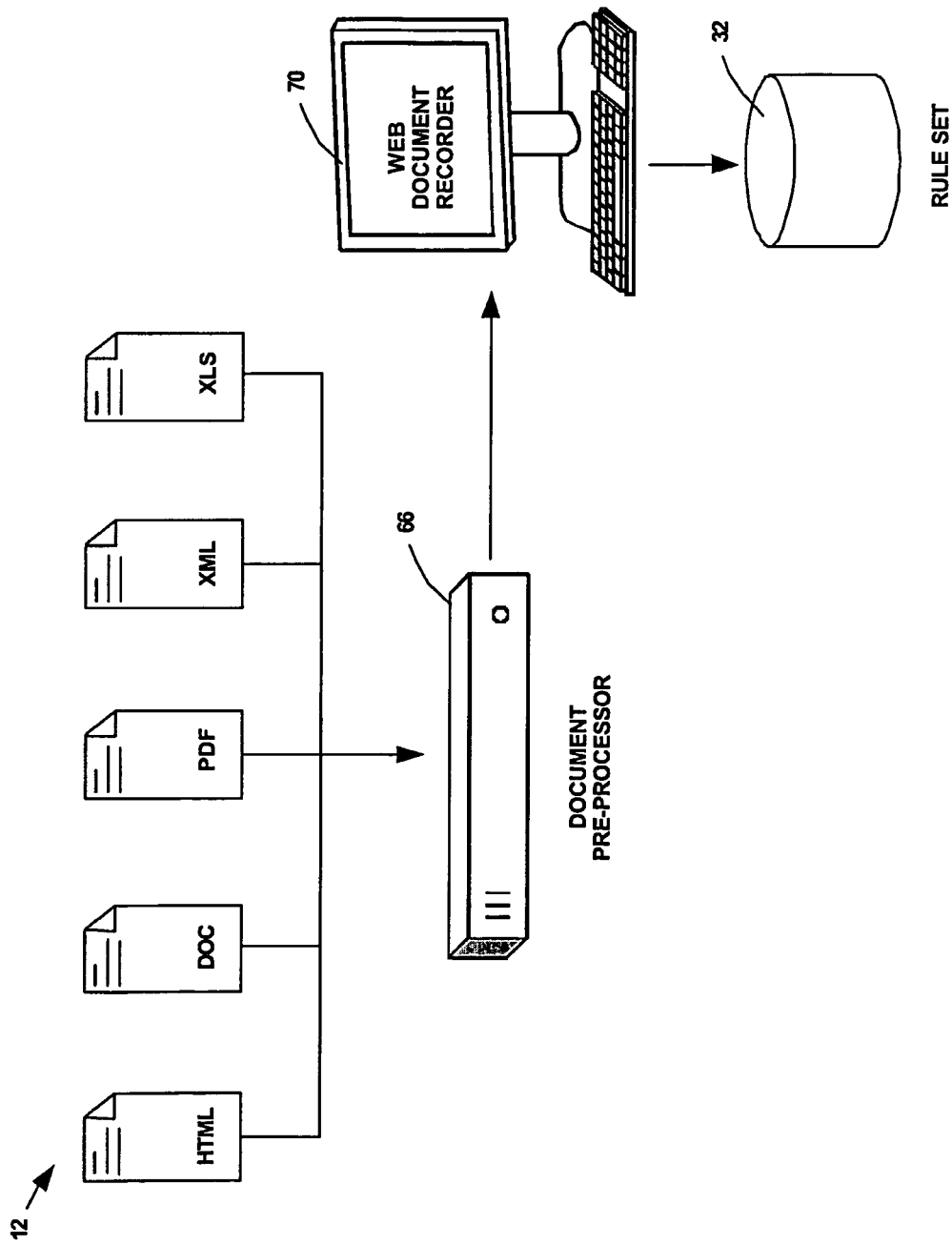
FIG. 18 is a block diagram of a system in accordance with the invention operating in a networked environment.

Referring also to FIG. 18, features of the present invention could be used over the Internet or on a web site. A web document recorder 70 could be connected to as a server for a web site. The recorder 70 could form a link to the documents via the Internet, but with the redaction engine running in the recorder 70. The recorder 70 could apply the rule set 32 as needed when the documents are viewed on the web site supported by the web document recorder 70.

Figure 19:
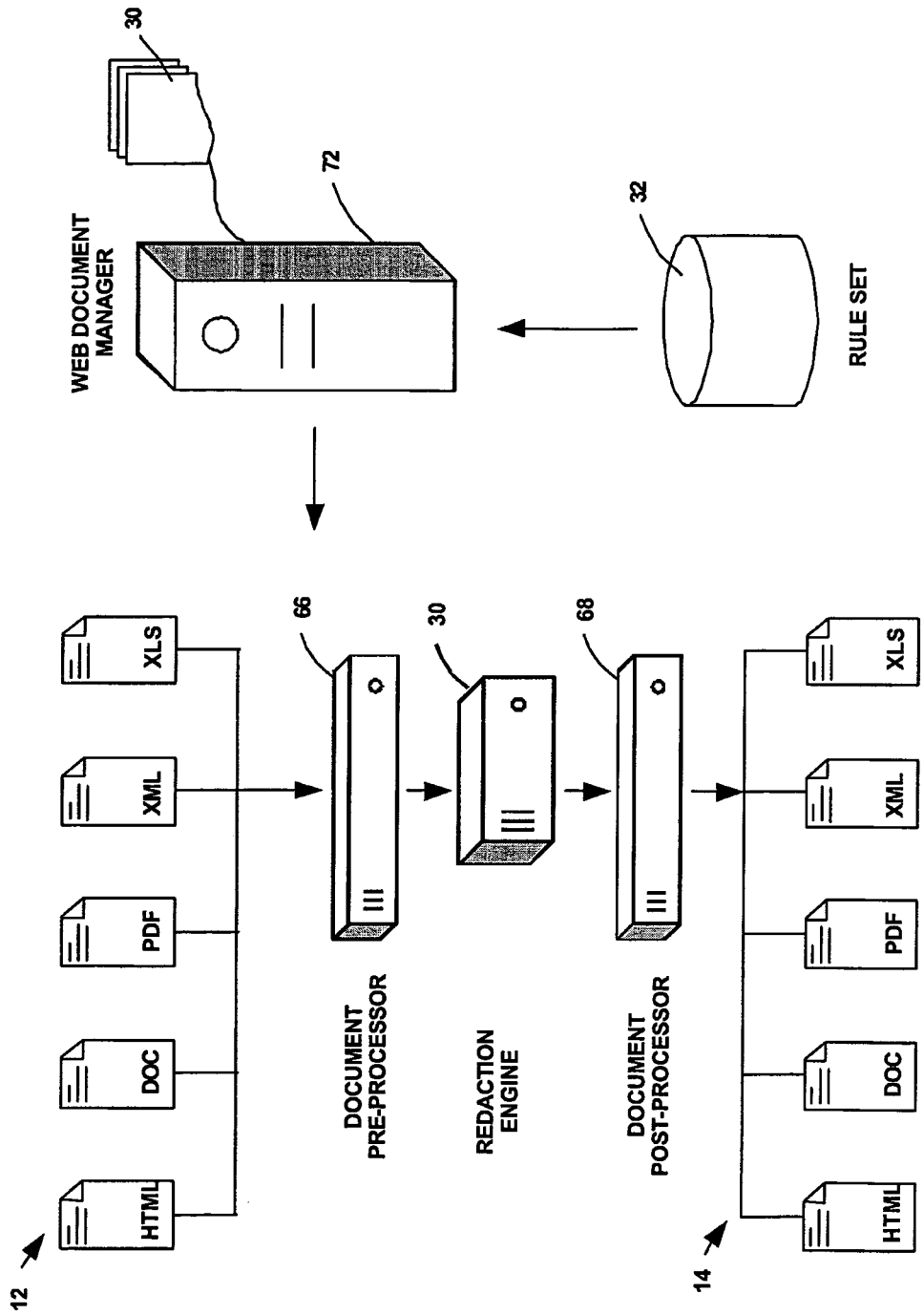
FIG. 19 is a block diagram of a system in accordance with another embodiment of the invention operating in a networked environment.

Referring also to FIG. 19, features of the present invention could be used with a web document manager or server 72. The manager 72 could manage application of the rule set with the document pre-processor 66, redaction engine 30 and document post-processor 68. With this type of system the same rule set 32 could be used with multiple redaction engines.

Figure 20:
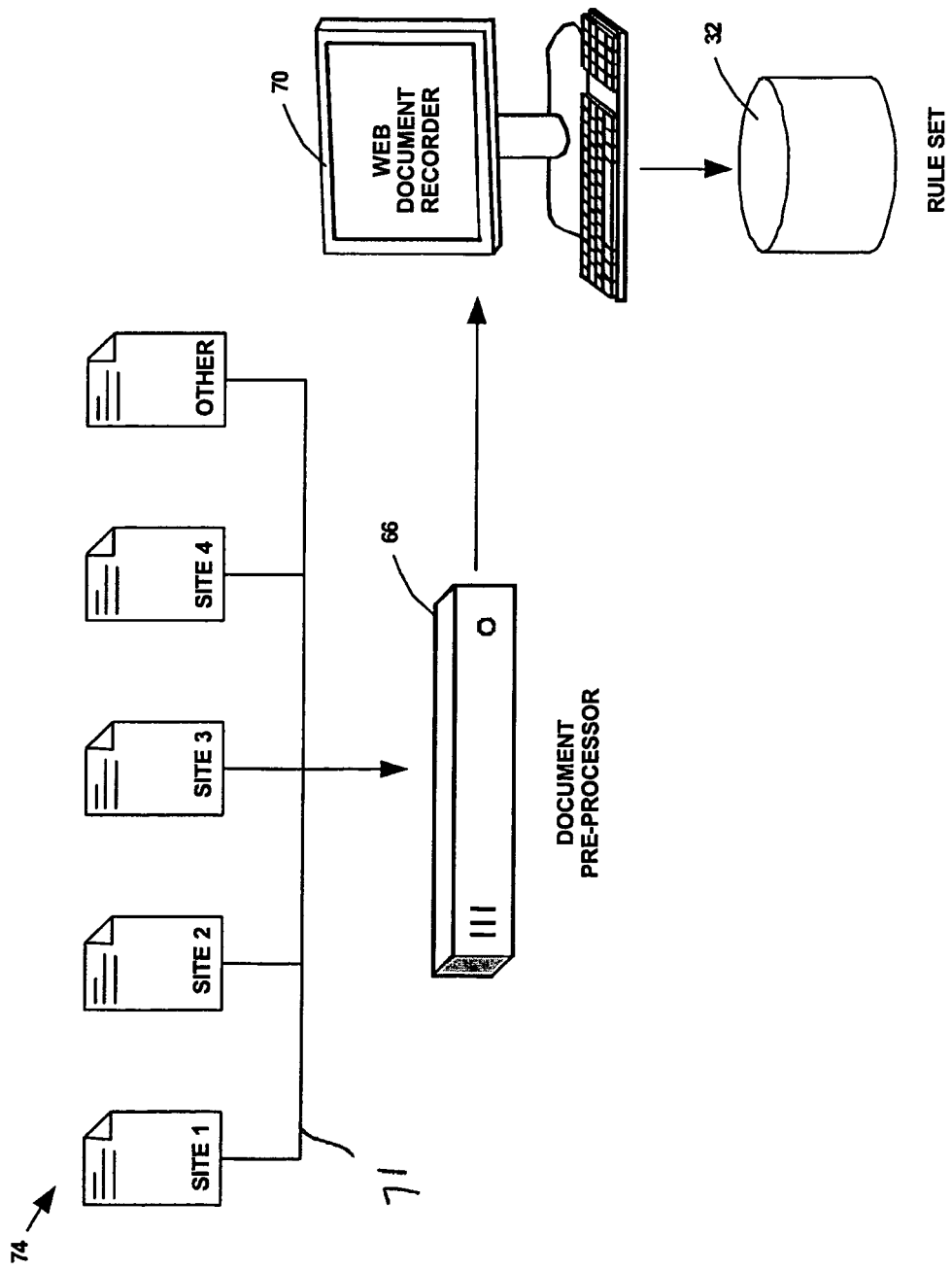
FIG. 20 is a block diagram depicting a system operating in accordance with the invention in which documents sourced from several sites over a network are input into a system for redaction purposes.

Referring also to FIG. 20, the system shown in FIG. 18 could be used in connecting documents from multiple sites 74 to the web document recorder 70 such as 71 symbolizing the Internet or a computer network.

Figure 21:
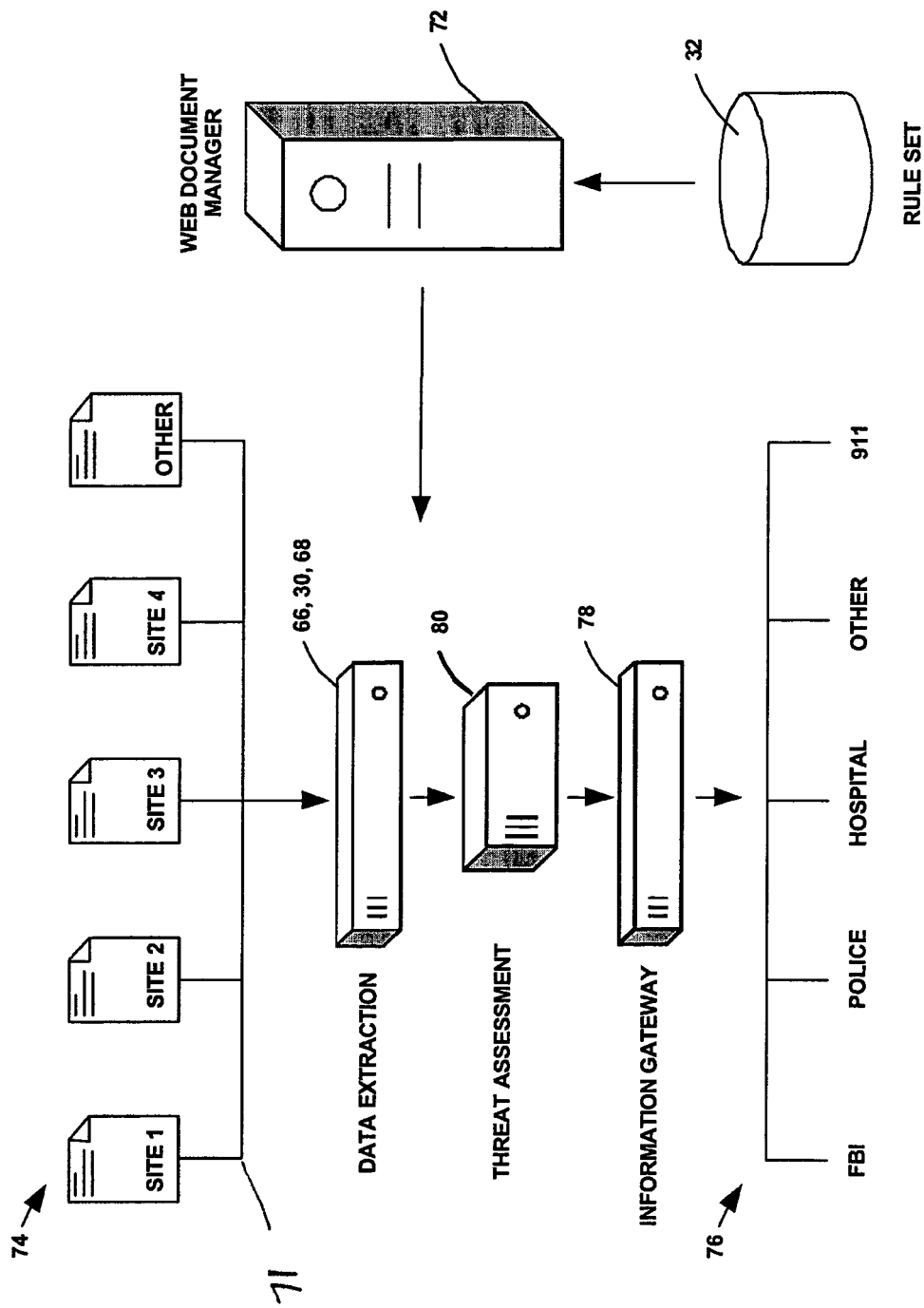
FIG. 21 is a block diagram depicting a system operating in accordance with the invention in which documents sourced from several sites over a network are input into a system for redaction purposes and then made available over a network following redaction.
Figure 22:
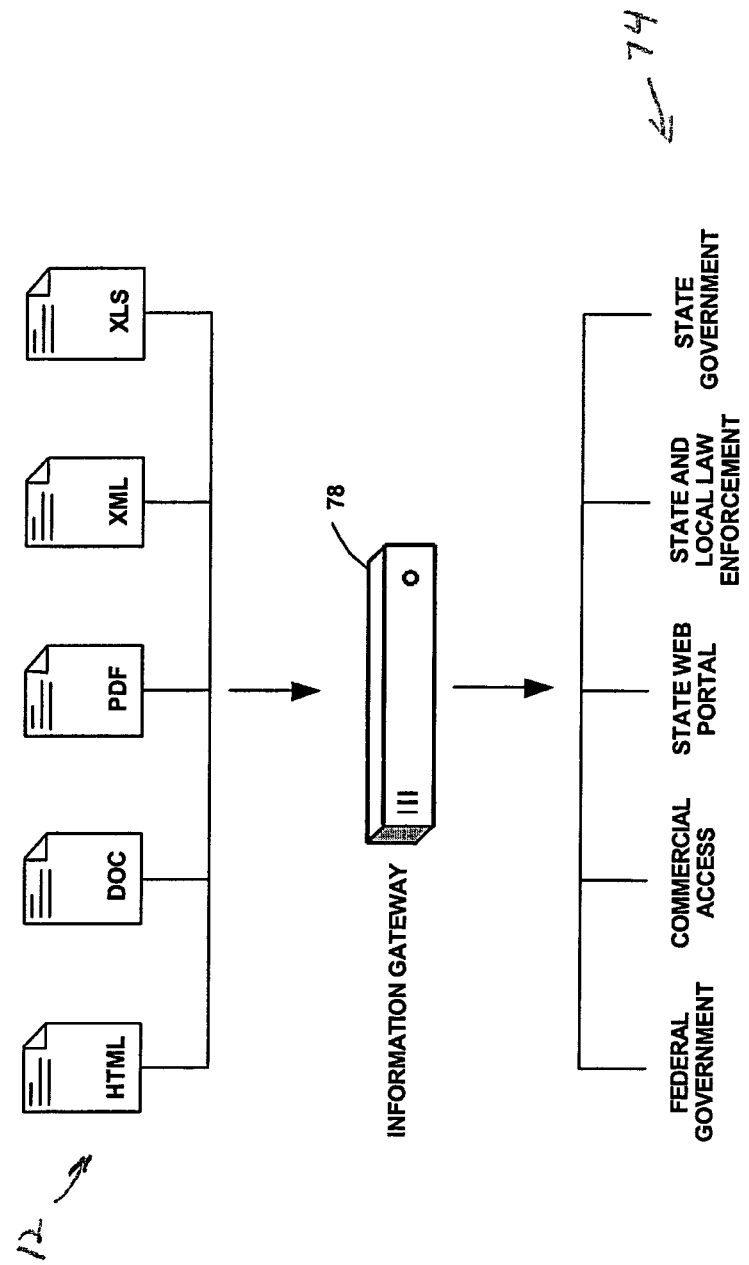
FIG. 22 is a block diagram depicting a system operating in accordance with the invention in which documents in several formats are made available over a network following redaction.

Referring also to FIG. 21, the system shown in FIG. 19 could be used in connecting documents from multiple sites 74 to multiple agencies 76 with the addition of an information gateway 78 and perhaps a threat assessment system 80. For example, the agencies could comprise the FBI, Police, Hospitals, 911 service, or other agency. The threat assessment system 80 could record web process, automate the web process, and correlate information across web sites and other information sources. Referring also to FIG. 22, the Gateway 78 can be adapted to sort and route information such that information is available to users on a predetermined basis, such as by document type or information in the cells of the documents for example.

With the invention, documents could be redacted in real time or, alternatively, the documents could be pre-redacted and stored for subsequent viewing. Alternatively, the system could be adapted to redact documents in real time, but once redacted store the redacted document for subsequent viewing without further automated redaction being needed for the same document. In other words, a library of redacted documents could be created over time. A batch of documents could also be redacted and stored if desired for an immediate library or database of redacted documents, thus allowing separation of the redacted document database from more secure original document databases.

The methods depicted and described herein can be tangibly embodied as a computer program in a computer-readable memory medium. Such computer-readable memory media comprise an aspect of the invention. Instructions of the computer program perform operations in accordance with the methods of the invention when executed by digital processing apparatus. Tangible computer-readable memory media included, but are not limited to, hard drives, CD- or DVD ROM, flash memory storage devices or RAM memory of a computer system.

With the invention, a system can be provided comprising a source of electronic documents to be redacted; a source of redaction rules; a redaction engine coupled to the source of electronic documents and the source of redaction rules, the redaction engine configured to redact the electronic documents in accordance with the redaction rules contained in the source of redaction rules, the redaction engine configured to perform operations, the operations comprising:
  accessing electronic documents to be redacted;
  accessing redaction rules from the source of redaction rules;
  redacting the electronic documents in accordance with the redaction rules, creating redactions in the electronic documents; and
  generating tangible versions of the electronic documents containing the redactions.

The source of electronic documents can comprise an electronic database. The source of electronic documents can comprise an electronic database accessible over a network. Generating a tangible version can comprise displaying redacted versions of the electronic documents on a display screen. Redacting the electronic documents in accordance with the redaction rules can comprise identifying the electronic documents by document type; selecting redaction rules to be applied to the electronic documents in dependence on the identified document type; and redacting the electronic documents in accordance with the selected redaction rules.

The electronic documents can comprise categories of information; where the redaction rules specify which categories of information are to be redacted; and where redacting the electronic documents in accordance with the redaction rules further comprises redacting information contained in the electronic documents corresponding to the categories of information specified in the redaction rules. The categories of information can comprise text information. The categories of information can comprise graphical information. The graphical information can comprise an organization logo. The categories of information can comprise visual information. The visual information can comprise photographic information. The electronic documents can comprise a plurality of document cells, where the selected redaction rules specify which document cells are to be redacted, and where redacting the electronic documents in accordance with the selected redaction rules further comprises redacting the document cells in the electronic documents specified in the selected redaction rules. The electronic documents can comprise categories of text, where the selected redaction rules specify which categories of text are to be redacted, and where redacting the electronic documents in accordance with the selected redaction rules further comprises redacting text in the electronic document corresponding to categories of text specified in the selected redaction rules. The electronic documents can contain identification codes identifying document type, and where identifying the document further comprises detecting the identification codes in the electronic documents to determine document type.

The identifying the electronic documents by document type can comprise receiving inputs identifying the electronic documents by document type. Identifying the electronic documents by document type can comprise using pattern recognition to identify the electronic documents by document type. Document redaction can be performed in real time. The electronic documents can be stored in unredacted form and wherein redacting the electronic documents in accordance with the redaction rules is performed in real time when a user not entitled to view in unredacted form an electronic document contained in the source of electronic documents accesses the electronic document. Redacting the electronic documents in accordance with the redaction rules can be performed prior to requests for electronic documents contained in the source of electronic documents, the operations further comprising: saving to memory redacted electronic documents.

The source of electronic documents can comprise a scanning system configured to convert hard copies of documents to electronic documents; and a database configured to store the electronic documents created by the conversion. Redactions can be reflected in the tangible version by redaction indicia, the redaction indicia identifying what categories of information have been redacted in the electronic documents. Redactions might not be identified by redaction indicia, the absence of redaction indicia masking what categories of information have been redacted in the electronic documents. The source of redaction rules can comprise a redaction rule entry system configured to receive redaction rules to be used when performing redaction operations. The redaction rule entry system can comprises a redaction rule editing system for editing pre-existing redaction rules comprising the source of redaction rules. The redaction rule entry system can be configured to receive commands associating redaction rules with specific electronic document types, wherein a particular redaction rule associated with a particular electronic document type is used when redacting electronic documents corresponding to the particular electronic document type.

The source of redaction rules can comprise rules specifying cells in electronic documents to be reproduced without redaction. The operations can comprise identifying cells in electronic documents corresponding to cells the redaction rules specify are to be reproduced without redaction; reproducing the identified cells without redaction. The operations can comprise detecting a conflict between at least one rule indicating a particular cell is to be redacted and at least one rule indicating the particular cell is to be reproduced without redaction; and resolving the conflict. The system can further comprise a manual redaction entry system configured to allow users to manually redact electronic documents; and where the source of redaction rules further comprises an automated system configured to monitor patterns of manual redactions entered by users and to generate redaction rules in dependence on the monitoring activity.

The source of redaction rules can comprise rules specifying categories of information to be reproduced without redaction. At least one of the categories of information can comprise text information. At least one of the categories of information can comprise graphical information. At least one of the categories of information can comprise visual information. The visual information further can comprise photographic images. The system is can be configured to redact electronic documents recorded in a plurality of different electronic formats.

The system can further comprise an electronic document pre-processor configured to identify which electronic format a particular electronic document is recorded in and to convert the particular electronic document to a common electronic format. Redacting the electronic documents in accordance with the redaction rules can comprise performing the redaction operations on the electronic documents when the electronic documents are in the common format. The electronic document pre-processor can be configured to impose a cell format on a particular electronic document in dependence on redaction rules contained in the source of redaction rules. Redacting the electronic documents in accordance with the redaction rules can comprise redacting cells generated in the particular electronic document by the imposition of a cell format. The system can further comprise an network gateway for disseminating redacted electronic documents to users.

A computer program product can be provided comprising a computer readable storage medium storing a computer program configured to perform redaction operations when executed by digital processing apparatus, the operations comprising:
  accessing an electronic document to be redacted;
  accessing at least one redaction rule to be applied to the electronic document;
  redacting the electronic document in accordance with the redaction rule; and
  storing the redacted electronic document in computer memory.

The computer program product operations can further comprise generating a tangible version of the redacted electronic document. The computer program product can generate a tangible version of the redacted electronic document and further comprises displaying the redacted electronic document on a display device. The computer program product can generating a tangible version of the redacted electronic document further comprising printing a hard copy of the redacted electronic document. The computer program product operations can further comprise: after accessing the electronic document to be redacted and prior to redacting the electronic document, converting the electronic document into a different electronic format, and wherein redacting the electronic document further comprises redacting the electronic document in the different electronic format. The computer program product operations can further comprise converting the redacted electronic document into a different electronic format.

With the invention a method can be provided comprising receiving redaction rules to be used in redacting electronic documents, where the redaction rules are specified in dependence on document type; storing the redaction rules to a computer memory, the computer memory comprising a source of redaction rules; accessing an electronic document to be redacted from a source of electronic documents; identifying the electronic document to be redacted by document type; accessing redaction rules from the source of redaction rules appropriate for use in redacting the type of document to which the electronic document corresponds; redacting the electronic document in accordance with the redaction rules specified for the document type to which the electronic document corresponds, creating redactions in the electronic document; and generating a tangible version of the electronic document containing the redactions.

Thus it is seen that the foregoing description has provided by way of exemplary and non-limiting examples a full and informative description of the best methods and apparatus presently contemplated by the inventors for performing document redaction. One skilled in the art will appreciate that the various embodiments described herein can be practiced individually; in combination with one or more embodiments described herein; or in combination with redaction systems differing from those described herein. Further, one skilled in the art will appreciate that the invention can be practiced by other than the described embodiments; that the described embodiments are presented for the purposes of illustration and not of limitation; and that the invention embraces all alternatives, modifications and variations that fall within the scope of the following claims.

What is claimed is:

1. A redaction system comprising:
  a scanner configured to scan a hard copy paper document and form an electronic document from the scanned hard copy paper document;
  at least one processor; and
  at least one non-transitory memory including computer program code, the at least one memory and the computer program code configured to, with the at least one processor, cause the apparatus to:
    identify a document type of the scanned hard copy paper document, where the document type is identified as one of a plurality of hard copy paper document types based at least partially upon at least one piece of information scanned on the hard copy paper document;
  a source of redaction rules stored in the at least one non-transitory memory; and
  where the at least one memory and the computer program code are configured to, with the at least one processor, form a redaction engine connected to the source of redaction rules, where the redaction engine is configured to redact the electronic document in accordance with at least one of the redaction rules contained in the source of redaction rules to thereby generate a redacted version of the electronic document containing at least one redaction, where the redaction engine is configured to redact a plurality of different document file formats of electronic documents, where the redaction engine is configured to identify the electronic document by document type of the scanned hard copy paper document and redact the electronic document in accordance with the redaction rules specific for that identified document type of the scanned hard copy paper document, wherein the source of redaction rules comprises at least one rule for automatically excluding information.

2. The system of claim 1 where the redaction rules specify categories of information to be redacted.

3. The system of claim 2 where the categories of information comprise text information.

4. The system of claim 2 where the categories of information comprise graphical information.

5. The system of claim 4 where the graphical information comprises an organization logo.

6. The system of claim 2 where the categories of information comprise visual information.

7. The system of claim 6 where the visual information comprises photographic information.

8. The system of claim 1 where the selected redaction rules specify document cells to be redacted.

9. The system of claim 1 where the selected redaction rules specify categories of text are to be redacted.

10. The system of claim 1 where the redaction engine is adapted to detect an identification code in the electronic document to determine the document type.

11. The system of claim 1 where the redaction engine is adapted to receive inputs identifying the electronic document by the document type.

12. The system of claim 1 the redaction engine is adapted to use pattern recognition to identify the electronic document by the document type.

13. The system of claim 1 where the redaction engine is adapted to provide the redaction with a redaction indicia.

14. The system of claim 13 where the redaction engine is adapted to provide the redaction indicia to identify what category of information has been redacted in the electronic documents.

15. The system of claim 1 where the redaction engine is adapted to provide the redaction without being identified by redaction indicia, the absence of redaction indicia masking a category of information that has been redacted in the electronic document.

16. The system of claim 1 further comprising a redaction rule entry system configured to receive the redaction rules to be used when performing redaction operations.

17. The system of claim 16 where the redaction rule entry system comprises a redaction rule editing system for editing pre-existing redaction rules.

18. The system of claim 16 where the redaction rule entry system is configured to receive commands associating redaction rules with specific electronic document types, wherein the redaction engine is configured such that a particular redaction rule associated with a particular electronic document type is used when redacting electronic documents corresponding to the particular electronic document type.

19. The system of claim 1 where the source of redaction rules comprises rules specifying cells in the electronic document to be reproduced without redaction.

20. The system of claim 1 further comprising:
a manual redaction entry system configured to allow a user to manually redact the electronic document; and
where the source of redaction rules further comprises an automated system configured to monitor patterns of manual redactions entered by a user and to generate new redaction rules for subsequent automatic redactions in dependence on the monitoring activity.

21. The system of claim 1 where the source of redaction rules comprises rules specifying categories of information to be reproduced without redaction.

22. The system of claim 21 where at least one of the categories of information comprises text information.

23. The system of claim 21 where at least one of the categories of information comprises graphical information.

24. The system of claim 21 at least one of the categories of information comprises visual information.

25. The system of claim 24 where the visual information further comprises photographic images.

26. The system of claim 1 further comprising an electronic document pre-processor configured to identify which electronic file format a particular electronic document is recorded in and to convert the particular electronic document to a common electronic format.

27. The system of claim 26 wherein the redaction engine is adapted to performing the redaction operations on the electronic document when the electronic document is in the common format.

28. The system of claim 27 where the electronic document pre-processor is configured to impose a cell format on a particular electronic document in dependence on the redaction rules contained in the source of redaction rules.

29. The system of claim 26 where the redaction engine is adapted to impose a cell format on the electronic document.

30. The system of claim 26 further comprising an electronic document post-processor configured to convert the redacted version of the electronic document from the common electronic file format in which it was redacted to another electronic file format.

31. The system of claim 1 wherein the redaction engine is adapted to be connected to a network gateway for disseminating the redacted version of the electronic document to users.

32. A computer program product comprising a non-transitory computer readable storage medium storing a computer program configured to perform redaction operations when executed by digital processing apparatus, the operations comprising:
identifying an electronic document by document type, where the document type is identified as one of a plurality of hard copy paper document types based at least partially upon at least one piece of information on a hard copy paper document scanned to form at least part of the electronic document;
accessing a plurality of redaction rules to be applied to the electronic document;
redacting the electronic document in accordance with at least one of the redaction rules based at least partially upon the identified document type of the hard copy paper document scanned to form at least part of the electronic document, where the redaction engine is configured to redact a plurality of different document file formats of electronic documents, and wherein redacting comprise applying at least one of the redaction rules to automatically exclude information based upon the identified document type of the hard copy paper document scanned to form at least part of the electronic document.

33. The computer program product of claim 32 wherein the operations further comprise:
after accessing the electronic document to be redacted and prior to redacting the electronic document, converting the electronic document into a different electronic file format, and wherein redacting the electronic document further comprises redacting the electronic document in the different electronic file format.

34. The computer program product of claim 33 wherein the operations further comprise:
converting the redacted electronic document into a different electronic file format.

35. A method comprising:
receiving redaction rules to be used in redacting electronic documents, where the redaction rules are specified in dependence on document type, where the document type is based at least partially upon at least one piece of information on a hard copy paper document which was scanned to form the electronic documents, and where the document type is one of a plurality of hard copy paper document types based at least partially upon the at least one piece of information on a plurality of hard copy paper documents;

storing the redaction rules to a non-transitory computer memory, the non-transitory computer memory comprising a source of redaction rules;

accessing an electronic document to be redacted from a source of electronic documents;

identifying the electronic document to be redacted by document type of the hard copy paper document scanned to form the electronic document;

accessing the redaction rules from the source of redaction rules appropriate for use in redacting the document type of the hard copy paper document to which the electronic document corresponds;

converting a file format of the electronic document into a different redaction common file format; and redacting the electronic document in the redaction common file format by a redaction engine in accordance with the redaction rules specified for the document type of the hard copy paper document to which the electronic document corresponds, and creating redactions in the electronic document, where the redaction engine is configured to redact a plurality of different document file formats of electronic documents of the hard copy paper documents, and wherein the redacting comprises applying at least one of the redaction rules to automatically exclude information based upon the identified document type.

36. A redaction system as in claim 1 where the at least one piece of information includes at least one of a code on the hard copy paper document and location of the information on the hard copy paper document.

* * * * *

UNITED STATES PATENT AND TRADEMARK OFFICE
CERTIFICATE OF CORRECTION

PATENT NO. : 10,853,570 B2
APPLICATION NO. : 11/544685
DATED : December 1, 2020
INVENTOR(S) : Bruce Matichuk, John Rebstock and Michael Kraft Page 1 of 1

It is certified that error appears in the above-identified patent and that said Letters Patent is hereby corrected as shown below:

In the Claims

In Claim 32:
Column 12, Line 40, "comprise" should be deleted and --comprises-- should be inserted.

Signed and Sealed this
Twelfth Day of January, 2021

Andrei Iancu
*Director of the United States Patent and Trademark Office*